US005369420A

United States Patent [19]

Bartky

[11] Patent Number: 5,369,420

[45] Date of Patent: Nov. 29, 1994

[54] METHOD OF TESTING MULTI-CHANNEL ARRAY PULSED DROPLET DEPOSITION APPARATUS

[75] Inventor: Walter S. Bartky, Chicago, Ill.

[73] Assignee: XAAR Limited, Cambridge, United Kingdom

[21] Appl. No.: 39,030

[22] PCT Filed: Oct. 4, 1991

[86] PCT No.: PCT/GB91/01727

§ 371 Date: Jun. 4, 1993

§ 102(e) Date: Jun. 4, 1993

[87] PCT Pub. No.: WO92/05962

PCT Pub. Date: Apr. 16, 1992

[30] Foreign Application Priority Data

Oct. 5, 1990 [GB] United Kingdom .............. 9021677.1

[51] Int. Cl.[5] ........................ B41J 2/125; G01D 18/00

[52] U.S. Cl. ...................................... 347/19; 73/865.9; 73/DIG. 4; 310/333; 310/338; 340/635; 324/512; 324/718; 324/727

[58] Field of Search ............................ 346/1.1, 140 R; 324/446, 512, 623, 722, 718, 727; 310/338, 339, 333; 73/64.53, 865.9, DIG 4; 340/635, 679, 514, 531

[56] References Cited

U.S. PATENT DOCUMENTS

| | | | |
|---|---|---|---|
| 4,296,421 | 10/1981 | Hara et al. | 346/140 R |
| 4,381,295 | 4/1983 | Kung et al. | 424/85 |
| 4,381,515 | 4/1983 | Bain | 346/140 R |
| 4,584,590 | 4/1986 | Fischbeck et al. | 346/140 R |
| 4,590,482 | 5/1986 | Hay et al. | 346/1.1 |
| 4,768,045 | 8/1988 | Koto | 346/140 R |
| 4,825,227 | 4/1989 | Fischbeck et al. | 346/1.1 |
| 4,835,435 | 5/1989 | Yeung et al. | 310/324 |
| 4,879,568 | 11/1989 | Bartky et al. | 346/140 R |
| 4,887,100 | 12/1989 | Michaelis et al. | 346/140 R |
| 5,016,028 | 5/1991 | Temple | 346/140 R |
| 5,028,812 | 7/1991 | Bartky | 307/246 |

FOREIGN PATENT DOCUMENTS

| | | | |
|---|---|---|---|
| 43286A1 | 1/1982 | European Pat. Off. | B41J 2/045 |
| 278590A1 | 8/1988 | European Pat. Off. | B41J 2/045 |
| 376606A1 | 7/1990 | European Pat. Off. | B41J 2/045 |

OTHER PUBLICATIONS

Ikoma, T. "Method to Detect in Situ Defects in Nozzles in Ink Jet Printers," IBM TDB; vol. 24 No. 3, Aug. 1981; p.

*Primary Examiner*—Benjamin R. Fuller
*Assistant Examiner*—Alrick Bobb
*Attorney, Agent, or Firm*—Marshall, O'Toole, Gerstein, Murray & Borun

[57] ABSTRACT

This invention relates to a method of testing multi-channel array pulsed droplet deposition apparatus (10) comprising a multiplicity of parallel channels (12) each with pulse imparting means for expelling droplets therefrom. The apparatus is located opposite a test module (20) having detecting elements (21) with channels of the apparatus opposed and close to the respective elements. Coupling fluid (23) fills the channels (12) to be tested and the space between the apparatus and the test module. Test signals are applied to impart energy pulses to the fluid in the channels opposite the detecting elements so that signals are passed to those elements by way of the fluid which are evaluated to assess the channel performance. Various forms of the detector elements and the apparatus are disclosed.

24 Claims, 5 Drawing Sheets

METHOD OF TESTING MULTI-CHANNEL ARRAY PULSED DROPLET DEPOSITION APPARATUS

This invention relates to a method of testing multi-channel array pulsed droplet deposition apparatus. Such apparatus of which a typical example is a drop-on-demand ink jet printer, comprises a multiplicity of parallel uniformly spaced channels mutually spaced in an array direction extending normal to the length of the channels and each with pulse imparting means for effecting droplet ejection therefrom.

Channel densities of two or more per millimetre are usual in state of the art drop-on-demand ink jet printers. Accordingly, considerable numbers of channels are employed in the printheads of such printers all of which are required to function satisfactorily to achieve the desired printing performance. It is however, impractical in a production environment because of time constraints to test sequentially the activity of each channel.

One object of the present invention therefore is to provide a method of testing expeditiously, a multi-channel array, pulsed droplet deposition apparatus of the kind set forth, to determine whether the array contains any defective channels.

The present invention consists in the method of testing a multi-channel array pulsed droplet deposition apparatus comprising a multiplicity of parallel channels uniformly spaced in an array direction extending normal to the length of the channels and each with pulse imparting means for effecting droplet ejection therefrom, said method comprising the steps of locating said apparatus opposite a test module having mutually spaced detecting elements with channels of said apparatus respectively opposed and in close proximity to said elements, providing coupling fluid in the channels of said apparatus opposed to said detecting elements and between said detecting elements and the channels opposed thereto, applying test signals to impart energy pulses to said fluid in said channels opposed to said detecting elements thereby to transmit signals through the coupling fluid to the detecting elements and evaluating the performance of said channels to which test signals are applied from the signals detected by the detecting elements.

The invention may be further characterised by mutually spacing said detecting elements at an integral multiple of the channel pitch of the channels of said apparatus, testing said channels opposed to said elements by supplying test signals to the coupling fluid therein, translating said apparatus relatively to said module through a channel pitch to dispose channels of the apparatus adjacent the tested channels in opposed relationship to said detecting elements and testing, by supplying test signals to the coupling fluid therein, the channels disposed by said translation opposite said detecting elements. Suitably, the method includes repeatedly translating until all channels of said apparatus are tested, said apparatus relatively to said module through a channel pitch and after each translation testing, by supplying test signals to the coupling fluid therein, the channels opposed to the detecting elements.

In one form, the method of the invention is characterised by employing detecting elements formed as conductive tracks on a side of a sheet of thickness poled piezo-electric material having an electrode on the side of said sheet remote from said tracks and locating said tracks in opposed relationship to channels of the apparatus being tested.

In another form, the method of the invention is characterised by forming said detecting elements of the test module as parallel channels formed in a sheet of thickness poled piezo-electric material between channel dividing side walls coated on channel facing surfaces thereof with electrode material so that said side walls operate as shear mode detectors. Advantageously this form of the invention is further characterised by locating the channels of the detecting elements opposite and parallel with open topped channels of said apparatus and disposing said coupling fluid in the channels of said test module, the channels of said apparatus facing the channels of said test module and the space between said test module and said apparatus.

In a further form, the method of the invention, in which the channels of said apparatus are closed by a cover plate, is characterised by disposing said detector elements opposite open ends of channels of the apparatus. Preferably, this form of the invention is further characterised by forming said test module with a sheet of thickness poled piezo-electric material having parallel channels therein formed between channel dividing side walls coated on channel facing surfaces thereof with electrode material so that said side walls operate as shear mode actuators and disposing said test module with the channels thereof perpendicular and opposite to the ends of channels of the apparatus.

In another form of the method of the invention and in which the channels of the apparatus comprise a base, channel dividing side walls upstanding from said base and shear mode actuators secured to the channel side walls of the respective channels opposite said base, said method is characterised by disposing said shear mode actuators opposite and in close proximity to said detecting elements. Suitably this form of the method of the invention is further characterised by forming said detecting elements form a base with channel dividing side walls upstanding from the base and shear mode actuators secured to the channel side walls of the respective channels opposite said base and disposing in facing relationship and close proximity the shear mode actuators of the apparatus and of the detecting elements.

The invention will now be described, by way of example, with reference to the accompanying drawings in which.

Throughout the drawings like parts are given the same references.

Figure 1:
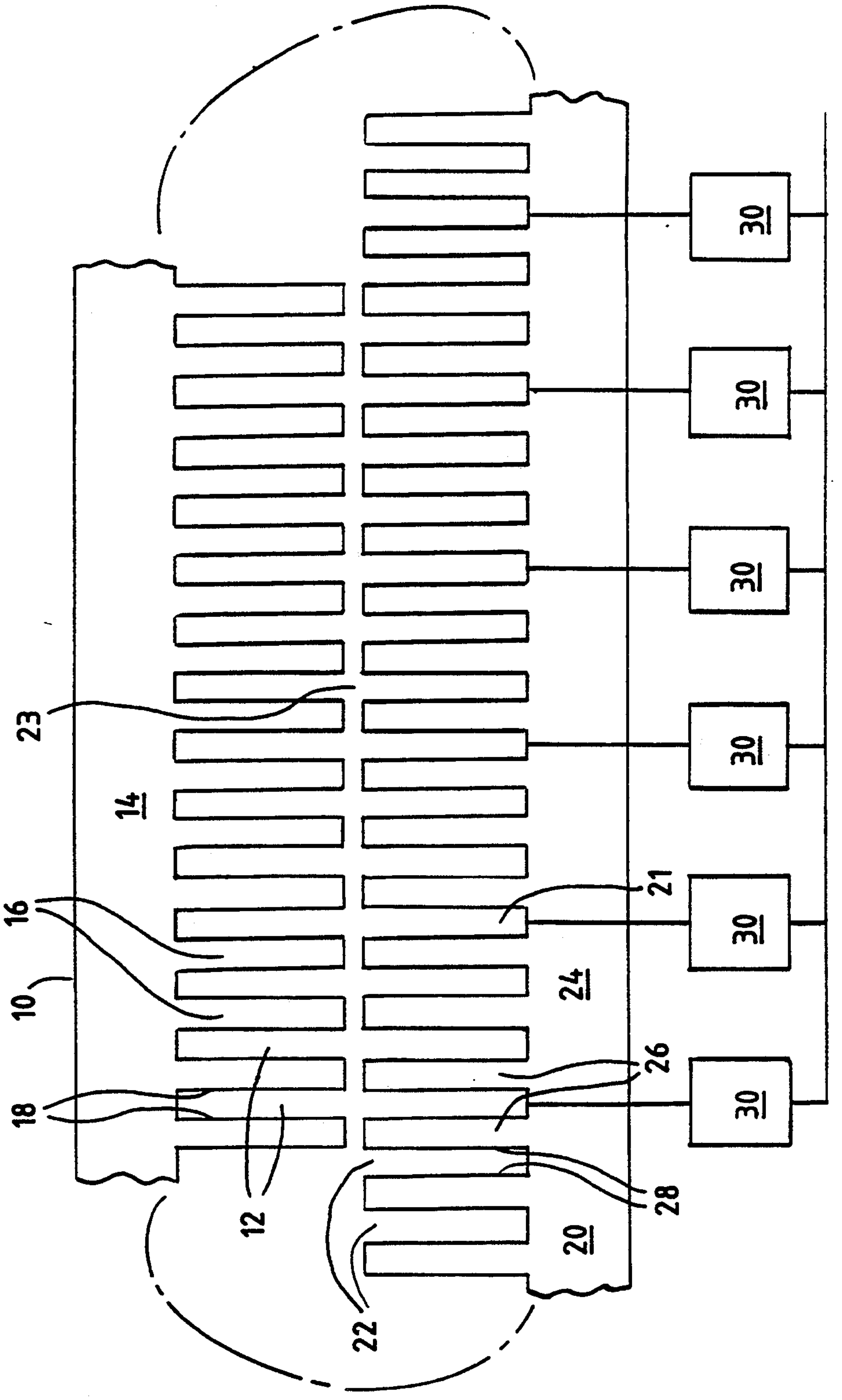
FIG. 1 illustrates to an enlarged scale a fragment of one form of apparatus for performing the method of the invention.

Referring to FIG. 1 a multi-channel array droplet deposition apparatus 10, suitably a drip-on-demand ink jet printhead, comprises a multiplicity of parallel uniformly spaced channels 12 which are defined by a base 14 and channel dividing side walls 16 formed from piezo-electric material poled in the thickness direction and the channel facing surfaces 18 of which are coated with metal layers (not shown) which constitute electrodes enabling respective electric fields to be applied transversely to the channel side walls to effect deflection thereof in shear mode. Array apparatus of the kind described is more fully described in our U.S. Pat. No. 4,887,100 and co-pending U.S. patent application Ser. No. 07/945,637 (corresponding to PCT International Publication No. WO 91/17051), the respective disclosures of which are incorporated herein by reference. In the latter application there is described a printhead formed from modules which are butted together along side surfaces thereof extending parallel with the channels. The apparatus 10 illustrated comprises a fragment of one such module.

The electrodes on the channel facing surfaces 18 are connected to an LSI chip and it is in this condition that the modules are tested as hereinafter described.

When the modules have been connected to their respective LSI chips it is important to carry out a 100 per cent functional test of each module. Plainly, if any modules are assembled into a printhead and subsequently found to be faulty, the cost of the fault or faults is greatly increased. The cost of all subsequent assembly work as well as that of all the modules assembled is wasted. It is accordingly prudent to effect tests early in the manufacturing programme so as to maximise yield and thus minimise cost.

As will be seen in FIG. 1, the apparatus 10 to be tested is located opposite a test module 20 formed with parallel channels 22 at the same spacing as the channels 12 and provided by a base 24 and channel dividing walls 26 formed from piezo-electric material. The channels 12 and 22 are open topped and disposed parallel with the tops of the channels of the apparatus 10 and the test module 20 in facing relationship and with a small gap separating them.

Channel facing surfaces 28 of the channels 22 are coated with metal layers (not shown) which provide electrodes and an electric field is developed across the electrodes of each channel wall when that wall, as hereinafter described, is activated as a result of shear mode displacement thereof.

In carrying out the test procedure, a coupling fluid 23 which may be a gas but preferably is a liquid, such as a solvent liquid, is drawn into the gap between the apparatus 10 and the test module to fill the facing channels and the gap therebetween.

Every third channel 22 has its electrodes connected to an evaluation circuit means 30 though it may be preferred so to connect every fourth channel 22 thereby to accord with the selection logic of the chip of the module of the apparatus 10 under test. Where every third channel 22 has an evaluation circuit means 30 connected thereto cross coupling between active channels 22, that is to say, channels 22 to which evaluation circuit means 30 are connected, is a few per cent and this is reduced by connecting one in four channels 22 only to evaluation circuit means 30. It will be appreciated that the channels 22 which are connected to evaluation circuit means 30 each provide a detecting element 21 for the signals supplied thereto by way of the coupling fluid.

The chip of the module of the apparatus 10 under test is connected using a test sequence of the print data to select for energisation those channels 12 of the apparatus 10 directly opposite those channels 22 of the test module 20 which are provided with evaluation circuit means 30 and an external a.c. signal is applied to the selected channels which vibrates the side walls of the selected channels 12 and causes fluid pressure modulations and flow therefrom primarily to the immediately opposed channels 22 of the test module. This fluid flow causes shear mode vibration of the walls of the channels to which the evaluation circuit means 30 are connected which develops an electric field across each such wall which is detected by the evaluation circuit means 30 which are parallel connected. The test thus enables the activity level of a group of channels 12 comprising, in the case illustrated, every third channel thereof to be ascertained.

After testing of one group of channels 12, the next group is similarly located for testing by translating the apparatus 10 through one channel pitch thereof and then repeating the test procedure described. In the case illustrated the testing of three groups of channels 12 in this way completes testing of the module of the apparatus 10. Where the level of activity of any one of the channel groups of the apparatus 10 is below a predetermined value, the fault so indicated requires that the module tested be rejected.

The information obtained from the test described includes a check on the operation of every line on the chip, the integrity of the leads from the chip to the channels and of the bonds between those leads and, at one end thereof terminals of the channel electrodes and, at the opposite end thereof, the chip terminals. The existence and continuity of the electrodes along the channels and extensions thereof providing terminals for the chip leads is also at the same time assessed as is the activity level of the piezo-electric material of the channel side walls 16.

The signals sensed by the detector means 30 are analogue signals which are supplied to an analogue to digital converter (not shown) the output of which may be indicative of whether a predetermined level of activity of each group of channels tested has or has not been reached or, alternatively, indicative that the level of activity of each channel group tested was one of a number of thresholds. Thus in the case of a four-bit word digital output, the converter would provide for sixteen possible levels of activity to be indicated whilst a one-bit word would indicate whether a threshold had or had not been reached. The level of imperfection of each group of channels tested can thus be measured where a four-bit word output is used and compared with a desired level to determine the acceptability or not of the module under test.

The presence of broken or cracked channel dividing walls 12 may also be checked by varying the frequency of the a.c. signals applied to the respective channels of the channel group under test about the resonant frequency of such walls the integrity of which is not flawed. A frequency response of the walls tested below an anticipated value which assumed all the walls tested were free from imperfections would indicate that one or more of the walls tested were not operating at the desired level of activity.

Further, the electrodes on the walls are suitably provided with a layer of passivation material the insulation properties of which can also be tested. To this end a detector is employed in each of the channels 22 to which evaluation circuit means 30 are connected which detects leakage current flow in the coupling fluid in those test module channels, the presence of leakage current indicating a flaw or flaws in the passivation layers. It will, of course, be apparent that to effect this test the coupling fluid has to be electrically conductive.

Figure 2:
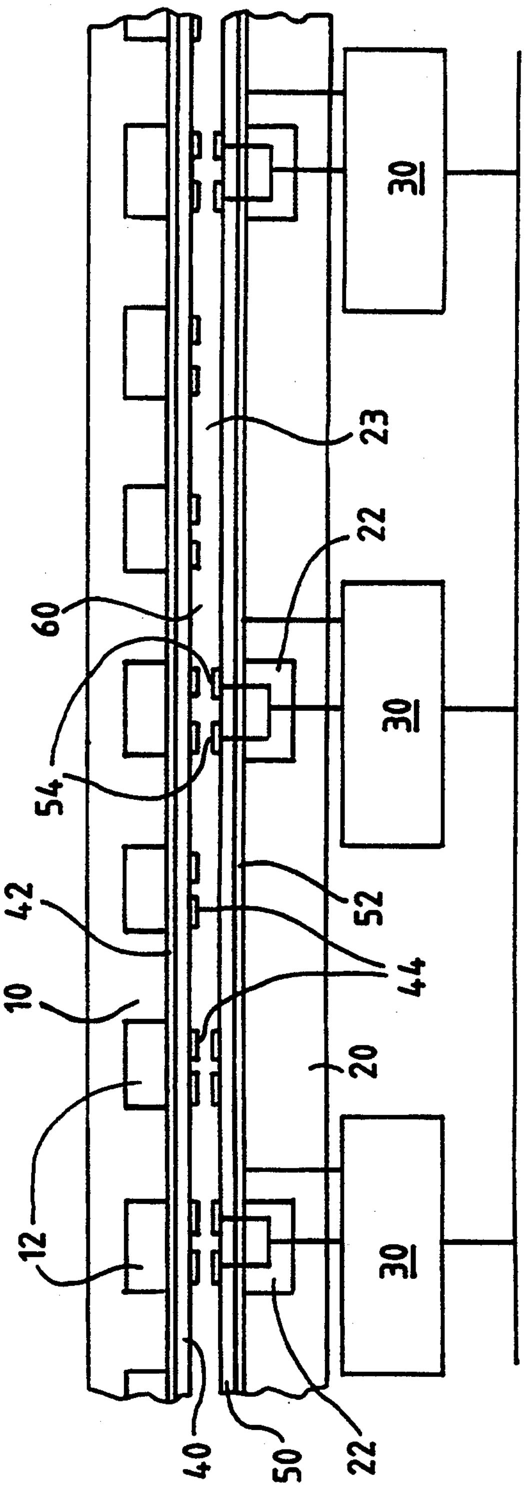
FIG. 2 illustrates to an enlarged scale a fragment of a second form of apparatus for performing the method of the invention.

Referring now to FIG. 2, the channels 22 of the test module are, as before, at three times the spacing of the channels 12 of the apparatus 10 to be tested which, as in the case of FIG. 1, may be in the form of a module which after testing and found to be satisfactory is butted with like modules to form the printhead. Across the tops of the channels 12 is a layer 40 of thickness poled piezo-electric material provided on the side thereof facing the channels 12 with a continuous, conductive, earthed electrode 42 and on the opposite side thereof with pairs of positive electrodes 44 at each channel the electrodes of each pair extending laterally outwards from a central region of the associated channel. This arrangement is disclosed in U.S. Pat. No. 4,825,227.

Similarly, the test module 20 is provided across the tops of its channels with a layer 50 of piezo-electric material on the side of which facing the channels 22 is a continuous, conductive, earthed electrode 52 whilst on the opposite side thereof are pairs of positive electrodes 54 for each of the channels 22 like the electrodes 44 of the channels 12. The electrodes 52 and 54 of those channels connected to circuit means 30 form respective detecting elements for signals generated at the tested channels.

Between the electrodes 44 and 54 respectively of the apparatus 10 under test and the test module 20 is left a small gap 60 into which id drawn the coupling fluid. As in the case of FIG. 1, the channels 12 located opposite the channels 22 are selected by a stream of test print data and an a.c. signal is applied between the electrodes 42 and 44 of the apparatus 10 of the selected channels. This causes shear mode deflection of the layer 40 of piezo-electric material relatively to the selected channels 12 which, through the medium of the coupling fluid, imparts a shear mode deflection to the layer 50 of piezo-electric material of the test module. This deflection creates a signal at the electrodes 52 and 54 which is supplied to the evaluation circuit means 30 and supplied, as before to the analogies to digital converter. The apparatus 10 is moved in steps of one channel pitch at each of which the test procedure described is performed.

Resonance tests and testing the integrity of passivation are not called for with this embodiment of the invention.

Figure 3:
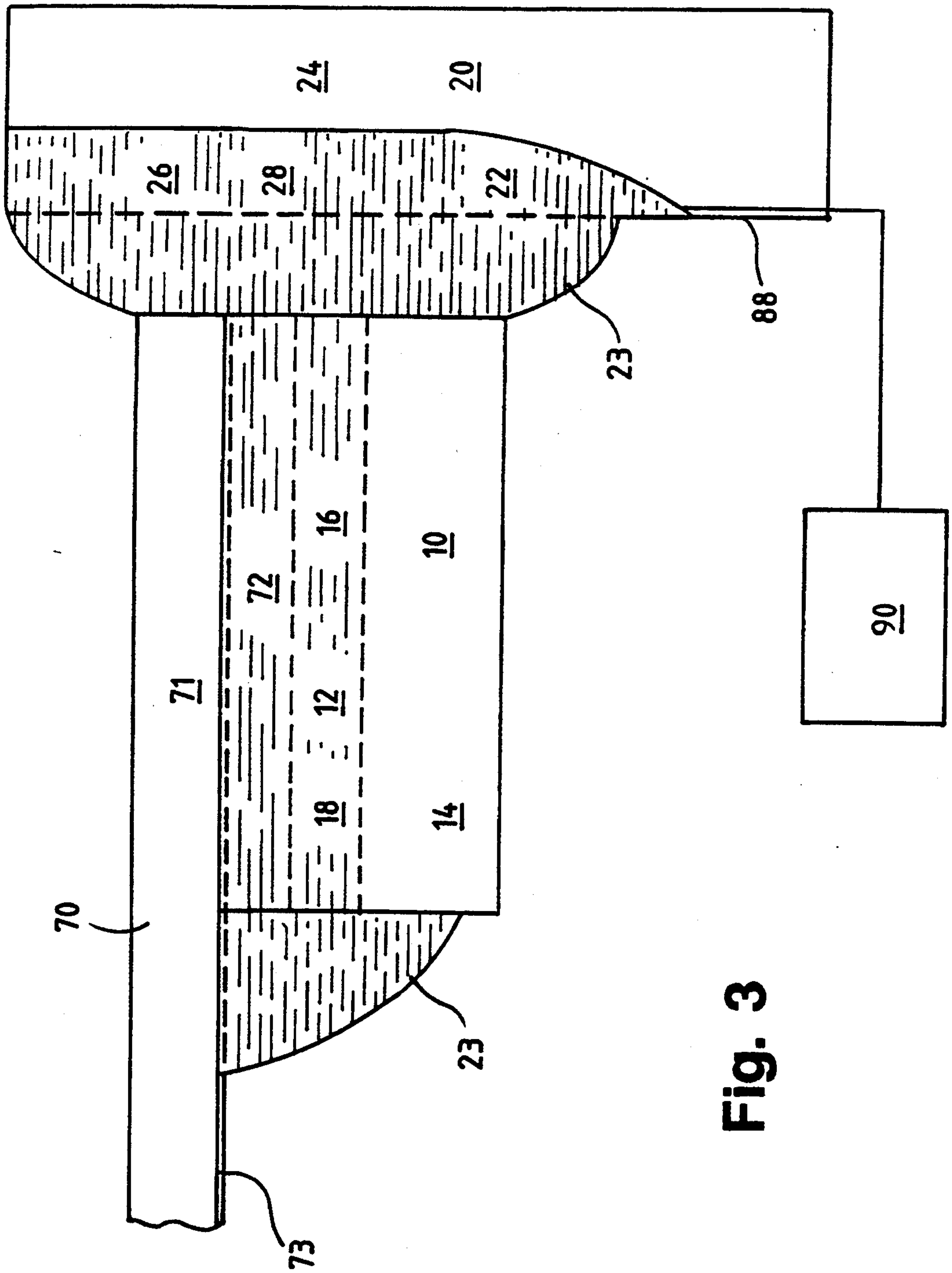
FIG. 3 illustrates to an enlarged scale in longitudinal section a fragment of a further form of apparatus for performing the method of the invention.

The apparatus of FIG. 3 comprises test module 20 of whilst the apparatus under test comprises a printhead 70 formed by modules 10 of generally similar construction to the module comprising the apparatus 10 of FIG. 1. Thus each module of the printhead comprises a base sheet 14 of piezo-electric material comprising a multiplicity of parallel, uniformly spaced channels 12 extending normal to the channel array direction. Channel facing surfaces, such as surface 18, of each side wall 16 which divides adjacent channels are coated with metal electrodes (not shown) so that actuating voltages can be applied across each of the opposite walls 16 of each channel 12 to deflect them in shear mode for effecting droplet ejection from the channel. The modules 10 forming the printhead 70 are butted together as described in co-pending U.S. patent application Ser. No. 07/945,637 and the open tops of the channels 12 are closed by a top sheet 71.

The closure of the channels 12 by top sheet 71 is effected by bonding in a controlled manner to obtain a controlled and preferably low bond compliance. It is a particular objective of the test procedure to be described, to characterise the integrity of this bond or, differently expressed, the compliance ratio K distributed along and across the printhead channels. On the sheet 71 are formed tracks 73 which by way of which are applied print data test signals energising selected channels of the printhead. To that end the tracks 73 respectively connect with the electrodes which each cover the channel facing surfaces of the walls 76 and line the channels.

The test module 20 is formed with parallel channels 22 cut in a sheet of piezo-electric material, said channels having the same channel spacing as those of the printhead 70 or a spacing which is an integral multiple of that spacing. Although it has similar form to the sheet 14, the test module may be formed with relatively shallow channels 22 so that the resonant frequency of the walls 26 of the channels which are open topped is comparable with or greater than the bonded side walls 16 of the printhead 70. Electrodes (not shown) lining the respective channels 12 are connected to respective tracks 88 on the sheet 81. The tracks 88 can either be connected to respective evaluation circuits 90 or can be connected to a common evaluation circuit 90. The channel electrodes, tracks 88 and circuit 90 form detecting elements at the spacing of the channels of the printhead which are simultaneously tested.

As will be seen, during testing, the channels 72 are disposed with the open ends thereof remote from the tracks 73 facing the channels 22 of the test module which extend normal to the channels 12. Both sets of channels are filled with coupling liquid 23 which also fills the space between the sets of channels. The coupling liquid preferably has a bulk modulus which matches that of the ink to be employed in the printhead. Further, the coupling liquid comprises only a small volume having regard to the scale of the printhead components and is held in place by capillary forces.

As the channels 12 are closed by the top sheet 71, it will be apparent that the test carried out with the apparatus of FIG. 3, takes place at a later stage in the manufacture of the printhead than the tests described in connection with the apparatus of FIG. 1. The test may accordingly be an additional test since it enables the integrity of the bond between the top sheet 71 and the channel walls to be assessed and further enables that property to be measured in different longitudinal sections of the channels. Also, it admits a measurement of the compliance ratio K (which is defined as the ratio of the compliance of a channel wall actuator in response to pressure in the channel thereof to the bulk compliance of the ink in the channel in response to that pressure) in selected channels or each channel and in different lengths of the channels. The compliance ratio K is discussed in our co-pending U.S. patent application Ser. No. 08/039,365 and is an important determining factor of printhead performance.

In operation of the arrangement of FIG. 3, a signal is supplied to the channels 12 selected for actuation by the test print data stream so as to vibrate those channels and those vibrations are coupled through the liquid 23 to the channels of the test module and cause signals to be developed in the tracks 88 which are connected to channels of the test module. If the tracks 88 connect with channels which are at the same pitch as the channels 12 then all the channels 12 facing the channels 22 are tested in a single step so that if the channels 22 are connected to respective evaluation circuit means 90 the integrity of each channel 72 of the array facing the test module, and in particular of the bond between the channels and the top sheet 71, is assessed. If, however, the tracks 88 are connected to channels at a multiple of the pitch of the channels 12, after each testing the printhead is stepped by one channel pitch and a further testing is carried out, so that a number of testings equal to the said multiple effects testing of all channels facing the test module.

Alternatively, if all the tracks 88 are connected to a single detection device 90 then if the channel pitch of the test module is the same as that of the printhead and the tracks 88 are connected to the respective channels 22, all the printhead channels facing the test module 20 are simultaneously tested and an evaluation of that particular segment of the printhead is made. If, however, the channel pitch of the channels of the test module 20 is a multiple of the channel pitch of the channel 12, a series, equal in number to that multiple, of tests is needed to complete the testing of the printhead segment facing the test module, each test effecting testing of a fraction equal to the inverse of the said multiple of the channels 12 facing the test module.

In practice testing is carried out at stages in the assembly of the printhead 70. Thus after a group of modules has been bonded together and to the sheet 71 testing as described is carried out. Further groups of modules are then added and between each such addition testing of the group last added is carried out.

Figure 4:
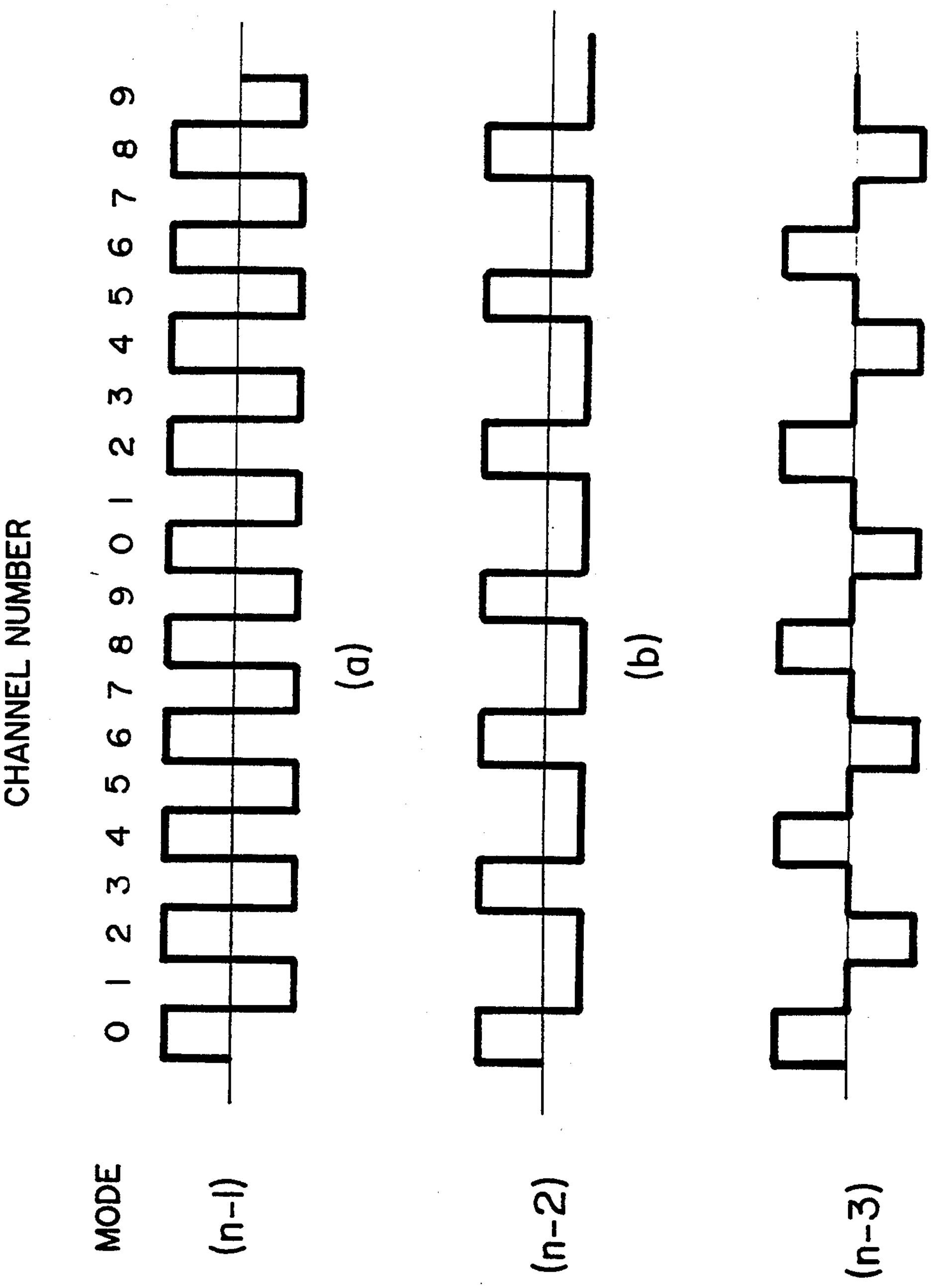
FIG. 4 illustrates voltage patterns applicable to the part of apparatus of FIG. 3 which is under test.

FIG. 4(*a*), (*b*) and (*c*) show spatially distributed voltage patterns illustrating the oscillatory voltages at a series twenty of the printhead channels 72, numbered in two banks of ten, during a first phase of the applied voltage pattern and in the following phase the spatial voltages of each pattern are inverted. There exist n different such voltage patterns for n channels corresponding to the n different modes of operation numbered (n−1), (n−2). . . 2, 1, 0. The three higher modes (n−1), (n−2), (n−3), are shown in FIGS. 4(*a*), (*b*) and (*c*). Each mode corresponds to a different magnitude of longitudinal velocity C of acoustic waves in the channels 72 of value $$C = \frac{C_o}{\sqrt{1 + \lambda K}}$$

where $c_o$ is the velocity of acoustic waves in the coupling fluid alone associated with its density and bulk modulus, K is the compliance ratio (as defined above) and where $0<\lambda<4K$ expresses the range of eigenvectors of the second difference matrix of the array.

It will be noted that $\lambda=4$ corresponds to the (n−1)th mode illustrated in FIG. 4(*a*), whereas $\lambda=0$ corresponds to uniform static pressure in all the channels represented by n=0.

Since each mode corresponds to a different longitudinal acoustic wave velocity, there exists a frequency $f_m=c_m/2L$ for $0\leqq m\leqq n-1$for each mode at which longitudinal resonant acoustic waves may be established in the channels. (Strictly, there are also harmonics of that frequency).

Accordingly the test signals applied to the tracks 73 are voltage patterns corresponding to one of the higher order modes shown in FIG. 4 at the corresponding resonant frequency, depending on channel length L so that acoustic waves for that mode are established in the channels of the array.

The channels, provided they are of high integrity, have uniform compliance ratio K and therefore uniform acoustic impedance. At the open channel ends, where the acoustic impedance becomes zero, the acoustic waves are reflected with inverse sign. Accordingly, every channel supports a resonant acoustic wave of the applied frequency and phase in accordance with the applied voltage pattern.

However, in the event of a fault in the channel, such as caused by a localised variation in the compliance ratio K in one or more channels or a localised leakage across the bond between adjacent channels or a localised broken or cracked wall, etc., the acoustic waves generated by the test signals acting on the wall actuators which are deflected in shear mode are reflected at the fault and consequently contain energy representative of the fault location.

The test module 20 abutting the open ends of the channels 12 remote from the tracks 73 receives energy radiated from the channel ends as the acoustic waves resonate from each channel which in turn generates corresponding signals in tracks 88 connected to the evaluation means 90.

One means for detection is to identify lower amplitude or out of phase signals in the tracks 88, which indicate the fault, whose location can be defined by acoustic time domain reflectometry. Alternatively the frequency of the test signals can be scanned in a range higher than the resonant frequency for the mode selected and a resonance in the faulty channel at the higher frequency, corresponding to resonance in the length between the fault and the end of the channel is readily detected from the signals in tracks 88.

Figure 5:
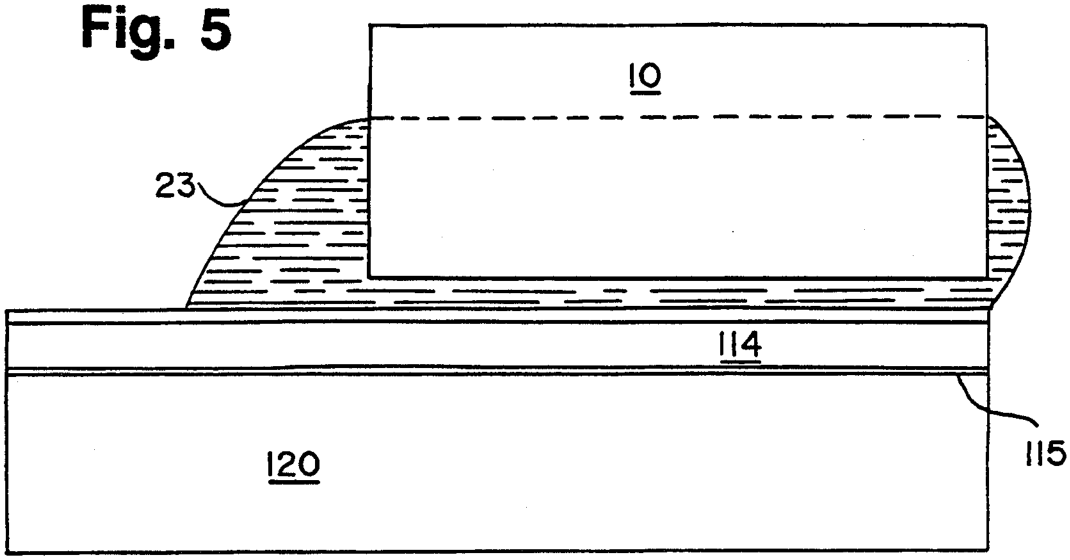
FIGS. 5 and 6 are longitudinal and transverse sectional views of another embodiment of the invention.
Figure 6:
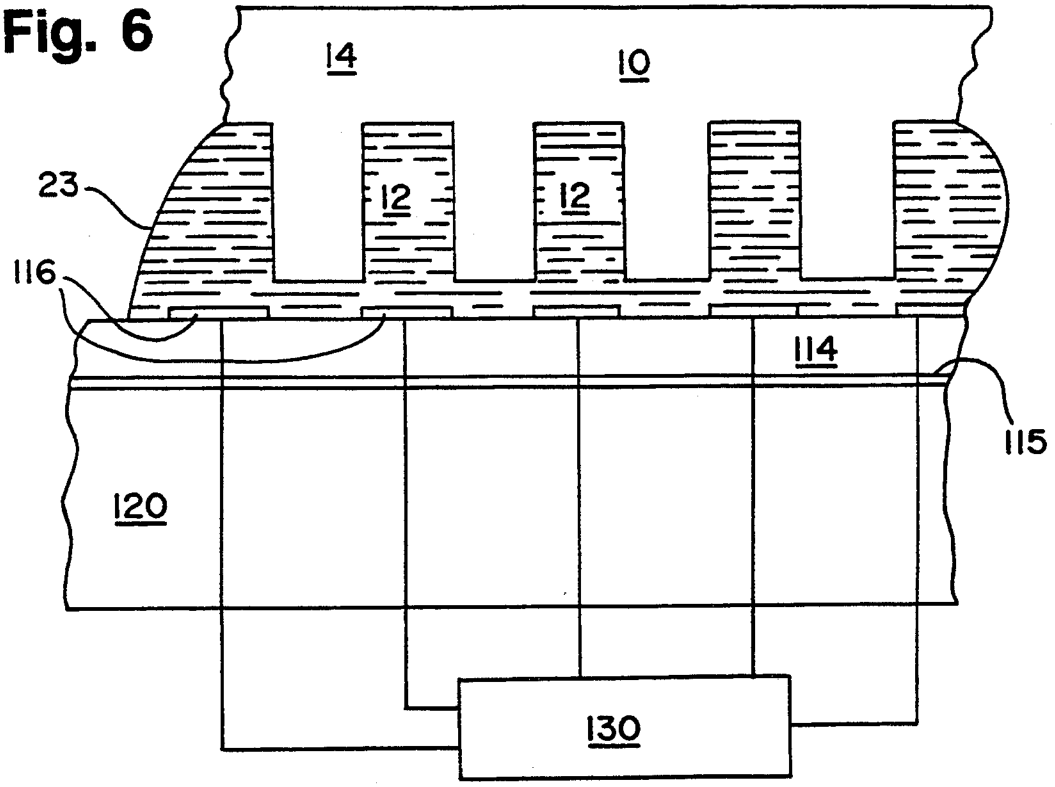

Referring now to FIGS. 5 and 6, an alternative form of test module 120 is provided which is disposed opposite the module 10 to be tested which is shown in similar form to the printhead apparatus 10 of FIG. 1 and comprises a sheet 14 of thickness poled piezo-electric material formed with parallel channels 12 and electrodes lining the channels. The two modules are coupled by coupling liquid 23 though air could serve as the coupling medium in this instance.

The test module 120 comprises a sheet 114 of piezo-electric material which is poled in the direction of its thickness. A continuous sheet electrode 115 is plated on one face of the sheet 114 and has tracks 116 forming electrodes on the opposite face of the sheet. The tracks are located opposite the channels and serve with the sheet 114 and electrode 115 as detecting elements for signals in the channels 12 which are coupled by way of the liquid 23 to those elements. Although, as shown, there is a detecting element for each channel the detecting elements could be spaced at an integral multiple of, suitably, three or four times the channel pitch.

The piezo-electric sheet 114 may be a sheet of ceramic, suitably PZT or of piezo-electric polymer (PVDF), both of which in response to acoustic pressure in the region of the tracks generate an electric potential. The piezo-electric response is in 3–3 mode and the potential generated is supplied either to an evaluation circuit 130 connected so as to be common to all the tracks or to separate such circuits respectively connected to the tracks.

A test module using this construction is less sensitive than the other forms of module described earlier, particularly in regard to FIGS. 1 and 3, because pressure couples less efficiently between a track and a channel than between opposing channels.

It will be apparent that changes in the embodiments of the invention described can be effected within the scope of the invention. Thus a test module of the type shown in FIG. 1 could be used to test apparatus provided with channels activated by roof-type actuators as described in connection with the apparatus 10 of FIG. 2 and vice versa. Also, acoustic detectors in the test module may be used to measure the shear mode activity of the actuators of the channels tested instead of the shear mode detectors described.

I claim:

1. A method of testing a multi-channel array pulsed droplet deposition apparatus comprising a multiplicity of parallel channels uniformly spaced in an array direction extending normal to a length of the channels and each of the channels with pulse imparting means for use in effecting droplet ejection therefrom, said method comprising the steps of locating said apparatus opposite a test module having mutually spaced detecting elements with channels of said apparatus respectively opposed and in close proximity to said elements, providing coupling fluid in the channels of said apparatus opposed to said detecting elements and between said detecting elements and the channels opposed thereto in order to establish a continuous fluid coupling between the channels and the detecting elements, applying test signals to impart energy pulses to said fluid in said channels opposed to said detecting elements in order to transmit signals through the coupling fluid to the detecting elements, and evaluating a pulse imparting performance of said channels to which test signals are applied from the signals detected by the detecting elements.

2. The method of claim 1, characterised by mutually spacing said detecting elements at an integral multiple of a channel pitch of the channels of said apparatus, testing said channels opposed to said elements by supplying test signals to impart energy pulses to the coupling fluid therein, translating said apparatus relatively to said module through the channel pitch to dispose channels of the apparatus adjacent the tested channels in opposed relationship to said detecting elements, and testing, by supplying test signals to the coupling fluid therein, the channels disposed by said translation opposite said detecting elements.

3. The method of claim 2, characterised by repeatedly translating, until all channels of said apparatus are tested, said apparatus relatively to said module through the channel pitch and after each translation, testing, by supplying test signals to the coupling fluid therein, the channels opposed to the detecting elements.

4. The method of claim 1, characterised by mutually spacing said detecting elements at a pitch of the channels of said apparatus and simultaneously testing all channels of said apparatus by applying to the coupling fluid therein test signals to impart energy pulses to said coupling fluid in the channels of the apparatus.

5. The method of claim 4, characterised by testing the channels of the apparatus individually by electrically connecting the detecting elements to respective evaluation means.

6. The method of claim 4, characterised by testing channels of the apparatus collectively by electrically connecting some or all of the detecting elements to common evaluation means.

7. The method of claim 2 characterised by simultaneously testing individually all channels of the apparatus opposed to the detecting elements by electrically connecting said elements to respective evaluation means.

8. The method of claim 2, characterised by simultaneously testing collectively all channels of the apparatus opposed to the detecting elements by electrically connecting said elements to common evaluation means.

9. The method of claim 1, characterised by employing detecting elements formed as conductive tracks on one side of a sheet of thickness poled piezo-electric material having two sides and an electrode on the other side of said sheet remote from said tracks and locating said tracks in opposed relationship to channels of the apparatus being tested.

10. The method of claim 9, characterised by employing liquid as the coupling fluid.

11. The method of claim 9, characterised by employing gas as the coupling fluid.

12. The method of claim 1, characterised by forming said detecting elements of the test module as parallel channels formed in a sheet of thickness poled piezo-electric material between channel dividing side walls coated on channel facing surfaces thereof with electrode material so that said side walls operate as shear mode detectors.

13. The method of claim 12, in which the channels of the apparatus are open-topped, characterised by locating the channels of the detecting elements opposite and parallel with the open topped channels of said apparatus and disposing said coupling fluid in the channels of said test module, the channels of said apparatus facing the channels of said test module and a space between said test module and said apparatus.

14. The method of claim 1, in which the channels of said apparatus are closed by a cover plate, characterised by disposing said detector elements opposite open ends of channels of the apparatus.

15. The method of claim 14, characterised by forming said test module with a sheet of thickness poled piezo-electric material having parallel channels therein formed between channel dividing side walls coated on channel facing surfaces thereof with electrode material so that said side walls operate as shear mode detectors and disposing said test module with the channels thereof perpendicular and opposite to the ends of channels of the apparatus.

16. The method of claim 15, characterised by dimensioning the channels of said test module to match a resonant frequency thereof to a resonant frequency of the channels of the apparatus.

17. The method of claim 15, characterised in that said detecting elements detect signals having a frequency content higher than a longitudinal resonant frequency of the channels of said apparatus.

18. The method of claim 15, characterised by assembling said apparatus from modules butted together at sides thereof extending parallel with the channels and testing said modules at stages in said assembling step.

19. The method of claim 1, in which the channels of the apparatus comprise a base, channel dividing side walls upstanding from said base, and shear mode actuators secured to the channel side walls of respective channels opposite said base, characterised by disposing said shear mode actuators opposite and in close proximity to said detecting elements.

20. The method of claim 19, characterised by forming said detecting elements from a base with channel dividing side walls upstanding from the base and shear mode actuators secured to the channel side walls of the respective channels opposite said base, and disposing in facing relationship and close proximity the shear mode actuators of the apparatus and of the detecting elements.

21. The method of claim 4, characterised by connecting said detecting elements in parallel to an evaluation circuit, an output of which is indicative of whether a level of an analogue signal supplied by the detecting element is of or below a predetermined level.

22. The method of claim 21, characterised by providing said evaluation circuit with an output which is indicative of one of a plurality of levels of analogue signal served by the detecting elements.

23. The method of claim 1, in which said detecting elements comprise parallel channels in said test module spaced at or an integral multiple of a pitch of the channels of said apparatus and having channel separating side walls which comprise shear mode actuators, characterised by providing leakage current detectors in the channels of the test module thereby to enable testing of passivation of electrode coatings of the channels tested.

24. The method of claim 1 in which said apparatus to be tested comprises a plurality of like modules butted together at sides thereof extending parallel with the channels to form a planar array of channels, characterised by testing modules of said apparatus to be tested before butting together thereof, rejecting those modules having defective channels, and assembling a plurality of modules found satisfactory to form said planar channel array.

* * * * *